(12) United States Patent
Burgett et al.

(10) Patent No.: US 9,678,513 B2
(45) Date of Patent: Jun. 13, 2017

(54) FLUID REGULATING UNIT

(71) Applicant: TESCOM CORPORATION, Elk River, MN (US)

(72) Inventors: Eric J. Burgett, McKinney, TX (US); Matthew Whitaker, McKinney, TX (US)

(73) Assignee: TESCOM CORPORATION, Elk River, MN (US)

( * ) Notice: Subject to any disclaimer, the term of this patent is extended or adjusted under 35 U.S.C. 154(b) by 30 days.

(21) Appl. No.: 14/791,860

(22) Filed: Jul. 6, 2015

(65) Prior Publication Data

US 2016/0291611 A1 Oct. 6, 2016

Related U.S. Application Data

(60) Provisional application No. 62/143,774, filed on Apr. 6, 2015.

(51) Int. Cl.
*F16K 31/00* (2006.01)
*G05D 16/04* (2006.01)

(52) U.S. Cl.
CPC .................. *G05D 16/04* (2013.01)

(58) Field of Classification Search
CPC .............................. G05D 16/04; F16K 31/12
USPC ......... 137/505, 505.11, 505.12, 613, 599.09, 137/599.08, 118.07, 84, 85, 86, 489.5, 137/492.5
See application file for complete search history.

(56) References Cited

U.S. PATENT DOCUMENTS

| | | | | |
|---|---|---|---|---|
| 2,495,785 A | * | 1/1950 | Stephens | F15B 11/003 137/102 |
| 2,603,235 A | * | 7/1952 | Kirkham | B66B 1/04 137/493.8 |
| 3,542,052 A | * | 11/1970 | Irwin | G05D 16/0683 137/116.5 |
| 3,545,485 A | * | 12/1970 | Clark | G05D 16/103 137/508 |
| 4,147,179 A | * | 4/1979 | Miura | F15B 13/02 137/599.09 |
| 4,197,877 A | * | 4/1980 | Winiasz | F16K 1/54 137/489.5 |
| 4,349,136 A | * | 9/1982 | Fallon | G05D 16/0602 137/467 |
| 4,566,488 A | * | 1/1986 | Chow | G05D 16/02 137/486 |

(Continued)

*Primary Examiner* — Mary McManmon
*Assistant Examiner* — Minh Le
(74) *Attorney, Agent, or Firm* — Marshall, Gerstein & Borun LLP (57) ABSTRACT

A fluid regulating unit includes a body, a pressure regulator, and a control valve. The body has an inlet, an outlet configured to output a regulated flow of fluid, and a flow path defined between the inlet and the outlet. The body integrates a pressure regulator and a control valve, each of which is disposed in the flow path. The pressure regulator has a regulator body, a control assembly configured to control a fluid flow through the regulator body, a sensor operatively coupled to the control assembly to control a position of the control element, and a bonnet movably coupled to the regulator body. The regulator body and the bonnet define a reference chamber disposed in the flow path. The reference chamber is configured to apply a reference force to the sensor to control the fluid flow through the regulator body.

21 Claims, 6 Drawing Sheets

(56) References Cited

U.S. PATENT DOCUMENTS

| | | | | | |
|---|---|---|---|---|---|
| 5,329,966 | A | * | 7/1994 | Fenimore | G05D 7/0635 137/501 |
| 5,755,254 | A | * | 5/1998 | Carter | G05D 16/0602 137/340 |
| 5,875,806 | A | * | 3/1999 | Maynard | G05D 7/0133 137/502 |
| 8,375,983 | B2 | * | 2/2013 | Niebel | G05D 16/10 137/503 |
| 8,616,228 | B1 | * | 12/2013 | Mayeaux | F17D 1/00 137/12 |
| 9,052,715 | B2 | * | 6/2015 | Kirchner | G05D 7/0126 |
| 2012/0298222 | A1 | * | 11/2012 | Zakay | G05D 16/0672 137/505.12 |
| 2014/0090725 | A1 | * | 4/2014 | Diaz | F16K 17/00 137/489.5 |
| 2014/0102559 | A1 | * | 4/2014 | Grenaway | G05D 16/163 137/505 |
| 2014/0261785 | A1 | * | 9/2014 | Andersson | G05D 16/0658 137/505 |
| 2014/0290760 | A1 | * | 10/2014 | Iitaka | G05D 16/10 137/505 |

\* cited by examiner

FLUID REGULATING UNIT

CROSS-REFERENCE TO RELATED APPLICATIONS

This application claims priority to U.S. Provisional Patent Application No. 62/143,774, entitled "Fluid Regulating Unit," which was filed on Apr. 6, 2015, the entire disclosure of which is hereby incorporated by reference herein.

FIELD OF THE DISCLOSURE

The present disclosure is directed to process control systems and, more particularly, to a fluid regulating unit for use in a process control system.

BACKGROUND

Process control systems, such as distributed or scalable process control systems like those used in chemical, petroleum or other processes, typically include one or more process controllers communicatively coupled to one or more field devices via analog, digital or combined analog/digital buses. The field devices, which may include, for example, fluid regulators, control valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, and uses this information to execute or implement one or more control routines to generate control signals, which are sent over the buses to the field devices to control the operation of the process. Information from each of the field devices and the controller is typically made available to one or more applications executed by one or more other hardware devices, such as host or user workstations, personal computers or computing devices, to enable an operator to perform any desired function regarding the process, such as setting parameters for the process, viewing the current state of the process, modifying the operation of the process, etc.

SUMMARY

In accordance with one exemplary aspect of the present invention, a fluid regulating unit includes a body, a pressure regulator, and a control valve. The body has an inlet and an outlet configured to output a regulated flow of fluid. A flow path is defined between the inlet and the outlet. The body integrates the pressure regulator and the control valve, which are each disposed in the flow path within the body. The pressure regulator has a first inlet port, a second inlet port, a first outlet port, and a second outlet port. The control valve has an inlet port and an outlet port. The first inlet port of the pressure regulator is fluidly coupled to the inlet of the body within the fluid regulating unit, the first outlet port of the pressure regulator is fluidly coupled to the inlet port of the control valve within the fluid regulating unit, the outlet port of the control valve is fluidly coupled to the second inlet port of the pressure regulator within the fluid regulating unit, and the second outlet port of the pressure regulator is fluidly coupled to the outlet of the body within the fluid regulating unit. Accordingly, the flow path facilitates fluid flow within the fluid regulating unit through the pressure regulator, through the control valve, and back through the pressure regulator.

In accordance with another exemplary aspect of the present invention, a fluid regulating unit includes a body, a pressure regulator, and a control valve. The body has an inlet, an outlet configured to output a regulated flow of fluid, and a flow path defined between the inlet and the outlet. The body integrates a pressure regulator and a control valve. The pressure regulator and the control valve are each disposed in the flow path. The fluid regulating unit further includes four flow passageways arranged in the body. The first flow passageway is configured to transfer a flow of fluid received via the inlet of the body to the pressure regulator. The pressure regulator is configured to output the flow of fluid at a desired pressure. The second flow passageway is configured to transfer the flow of the fluid output by the pressure regulator to the control valve. The control valve is configured to output the flow of fluid at a desired flow rate. The third flow passageway is configured to transfer the flow of the fluid output by the control valve to a reference chamber of the pressure regulator. The fourth flow passageway is configured to transfer the flow of fluid from the reference chamber of the pressure regulator to the outlet of the body.

In accordance with another exemplary aspect of the present invention, a fluid regulating unit includes a body, a pressure regulator, and a control valve. The body has an inlet, an outlet configured to output a regulated flow of fluid, and a flow path defined between the inlet and the outlet. The body integrates a pressure regulator and a control valve, each of which is disposed in the flow path. The pressure regulator has a regulator body, a control assembly configured to control a fluid flow through the regulator body, a sensor operatively coupled to the control assembly to control a position of the control element, and a bonnet movably coupled to the regulator body. The regulator body and the bonnet define a reference chamber disposed in the flow path. The reference chamber is configured to apply a reference force to the sensor to control the fluid flow through the regulator body.

In further accordance with any one or more of the foregoing exemplary aspects of the present invention, a fluid regulating unit may further include, in any combination, any one or more of the following preferred forms.

In one preferred form, the fluid regulating unit further includes a control knob coupled to and extending outwardly from the body. The control knob is configured to control the control valve.

In another preferred form, the control valve includes a body and a control element movably disposed within the body. The control element is movable relative to an orifice formed in the body of the control valve to control flow rate.

In another preferred form, the control valve includes a metering valve.

In another preferred form, the fluid regulating unit further includes a bonnet movably coupled to the body.

In another preferred form, the bonnet and a body of the pressure regulator define the reference chamber.

In another preferred form, the reference chamber is positioned between the second inlet port and the second outlet port of the pressure regulator.

In another preferred form, the bonnet includes a bleed port and a bleed plug movably disposed in the bleed port. The bleed port is in fluid communication with the outlet port of the control valve, and the bleed plug is movable between a closed position in which the bleed plug seals the bleed port and an open position in which the bleed port exhausts air from the control valve.

In another preferred form, the fluid regulating unit further includes a biasing spring disposed in the reference chamber.

The reference force applied by the reference chamber includes a first force generated by the biasing spring and a second force generated by the fluid flowing through the reference chamber.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several FIGS., in which:

DETAILED DESCRIPTION

The present disclosure is directed to a fluid regulating unit for use in a process control system. The fluid regulating unit integrates a pressure regulator, a control valve, and flow paths for fluid flowing therethrough into or within a single body. Fluid flowing into the unit is regulated by the pressure regulator and then provided to the control valve. The control valve controls the fluid flow at the desired rate. The fluid flow output from the control valve is then routed back to the pressure regulator for use as a reference pressure. The fluid flow subsequently exits as downstream flow. The fluid regulating unit disclosed herein requires little to no assembly, maintains flow control, and, by virtue of having no external plumbing for fluid flow, significantly reduces the potential for leakage.

Figure 1:
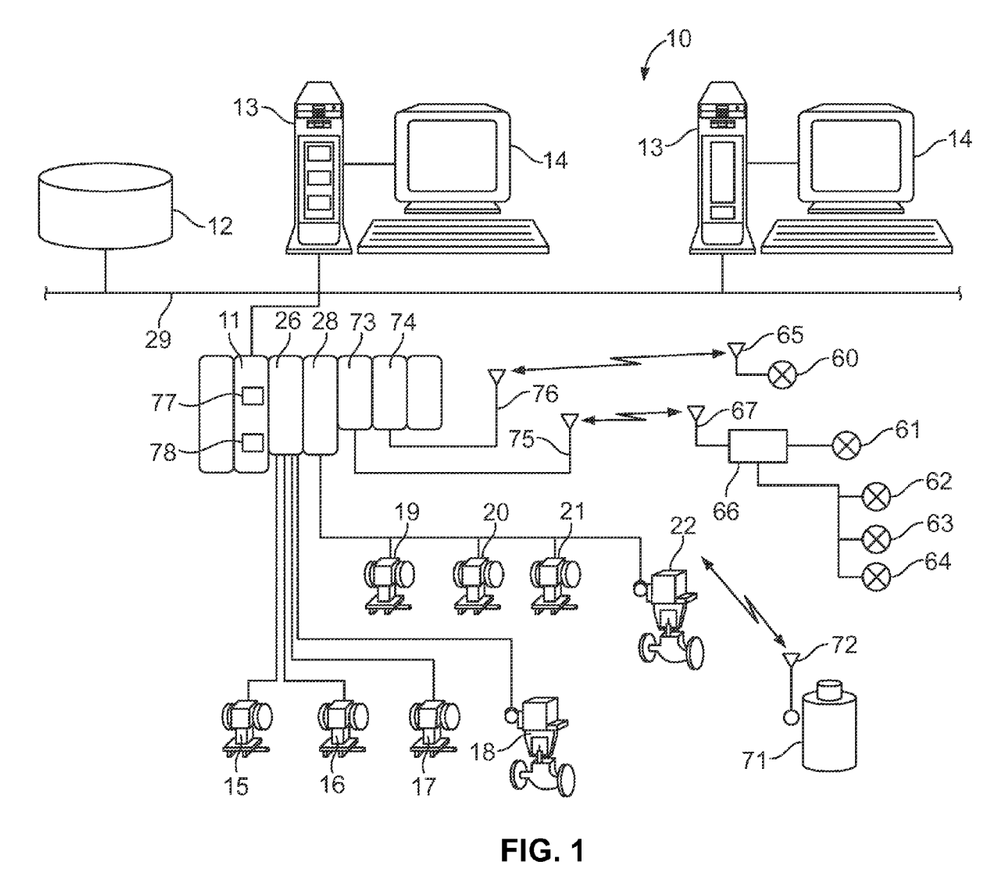
FIG. 1 is a schematic representation of an example process control system having a fluid regulating unit constructed in accordance with the principles of the present invention.

Referring now to FIG. 1, a process control system 10 constructed in accordance with one version of the present invention is depicted incorporating one or more field devices 15, 16, 17, 18, 19, 20, 21, 22, and 71 in communication with a process controller 11, which in turn, is in communication with a data historian 12 and one or more user workstations 13, each having a display screen 14. So configured, the controller 11 delivers signals to and receives signals from the field devices 15, 16, 17, 18, 19, 20, 21, 22, and 71 and the workstations 13 to control the process control system.

In additional detail, the process controller 11 of the process control system 10 of the version depicted in FIG. 1 is connected via hardwired communication connections to field devices 15, 16, 17, 18, 19, 20, 21, and 22 via input/output (I/O) cards 26 and 28. The data historian 12 may be any desired type of data collection unit having any desired type of memory and any desired or known software, hardware or firmware for storing data. Moreover, while the data historian 12 is illustrated as a separate device in FIG. 1, it may instead or in addition be part of one of the workstations 13 or another computer device, such as a server. The controller 11, which may be, by way of example, a DeltaV™ controller sold by Emerson Process Management, is communicatively connected to the workstations 13 and to the data historian 12 via a communication network 29 which may be, for example, an Ethernet connection.

As mentioned, the controller 11 is illustrated as being communicatively connected to the field devices 15, 16, 17, 18, 19, 20, 21, and 22 using a hardwired communication scheme which may include the use of any desired hardware, software and/or firmware to implement hardwired communications, including, for example, standard 4-20 mA communications, and/or any communications using any smart communication protocol such as the FOUNDATION® Fieldbus communication protocol, the HART® communication protocol, etc. The field devices 15, 16, 17, 18, 19, 20, 21, and 22 may be any types of devices, such as sensors, control valve assemblies, transmitters, positioners, etc., while the I/O cards 26 and 28 may be any types of I/O devices conforming to any desired communication or controller protocol. In the embodiment illustrated in FIG. 1, the field devices 15, 16, 17, 18 are standard 4-20 mA devices that communicate over analog lines to the I/O card 26, while the digital field devices 19, 20, 21, 22 can be smart devices, such as HART® communicating devices and Fieldbus field devices, that communicate over a digital bus to the I/O card 28 using Fieldbus protocol communications. Of course, the field devices 15, 16, 17, 18, 19, 20, 21, and 22 may conform to any other desired standard(s) or protocols, including any standards or protocols developed in the future.

In addition, the process control system 10 depicted in FIG. 1 includes a number of wireless field devices 60, 61, 62, 63, 64 and 71 disposed in the plant to be controlled. The field devices 60, 61, 62, 63, 64 are depicted as transmitters (e.g., process variable sensors) while the field device 71 is depicted as fluid regulating or control unit including, for example, a fluid regulator and a control valve. Wireless communications may be established between the controller 11 and the field devices 60, 61, 62, 63, 64 and 71 using any desired wireless communication equipment, including hardware, software, firmware, or any combination thereof now known or later developed. In the version illustrated in FIG. 1, an antenna 65 is coupled to and is dedicated to perform wireless communications for the transmitter 60, while a wireless router or other module 66 having an antenna 67 is coupled to collectively handle wireless communications for the transmitters 61, 62, 63, and 64. Likewise, an antenna 72 is coupled to the unit 71 to perform wireless communications for the unit 71. The field devices or associated hardware 60, 61, 62, 63, 64, 66 and 71 may implement protocol stack operations used by an appropriate wireless communication protocol to receive, decode, route, encode and send wireless signals via the antennas 65, 67 and 72 to implement wireless communications between the process controller 11 and the transmitters 60, 61, 62, 63, 64 and the unit 71.

If desired, the transmitters 60, 61, 62, 63, 64 can constitute the sole link between various process sensors (transmitters) and the process controller 11 and, as such, are relied upon to send accurate signals to the controller 11 to ensure that process performance is not compromised. The transmitters 60, 61, 62, 63, 64, often referred to as process variable transmitters (PVTs), therefore may play a significant role in the control of the overall control process. Additionally, the fluid regulating unit 71 may provide measurements made by sensors within the fluid regulating unit 71 or may provide other data generated by or computed by the fluid regulating unit 71 to the controller 11 as part of its operation. Of course, as is known, the fluid regulating unit 71 may also receive control signals from the controller 11 to effect physical parameters, e.g., flow, within the overall process.

The process controller 11 is coupled to one or more I/O devices 73 and 74, each connected to a respective antenna 75 and 76, and these I/O devices and antennas 73, 74, 75, 76 operate as transmitters/receivers to perform wireless communications with the wireless field devices 61, 62, 63, 64 and 71 via one or more wireless communication networks. The wireless communications between the field devices (e.g., the transmitters 60, 61, 62, 63, 64 and the fluid regulating unit 71) may be performed using one or more known wireless communication protocols, such as the WirelessHART® protocol, the Ember protocol, a WiFi protocol, an IEEE wireless standard, etc. Still further, the I/O devices 73 and 74 may implement protocol stack operations used by these communication protocols to receive, decode, route, encode and send wireless signals via the antennas 75 and 76 to implement wireless communications between the controller 11 and the transmitters 60, 61, 62, 63, 64 and the fluid regulating unit 71.

As illustrated in FIG. 1, the controller 11 conventionally includes a processor 77 that implements or oversees one or more process control routines (or any module, block, or sub-routine thereof) stored in a memory 78. The process control routines stored in the memory 78 may include or be associated with control loops being implemented within the process plant. Generally speaking, and as is generally known, the process controller 11 executes one or more control routines and communicates with the field devices 15, 16, 17, 18, 19, 20, 21, 22, 60, 61, 62, 63, 64, and 71, the user workstations 13 and the data historian 12 to control a process in any desired manner(s).

In some cases, the field device 71 can be a chemical injection assembly that includes or is formed from two distinct or separate components, a pressure regulator and a control valve (e.g., a metering valve) arranged downstream of and fluidly coupled to the pressure regulator. The pressure regulator regulates the pressure of a fluid flowing therethrough. The control valve is configured to control the flow rate of the regulated fluid after it has passed through the pressure regulator. The control valve then outputs the fluid to a downstream element of the process control system. The control valve may also route the fluid back to the pressure regulator for use as a reference pressure.

Figure 2:
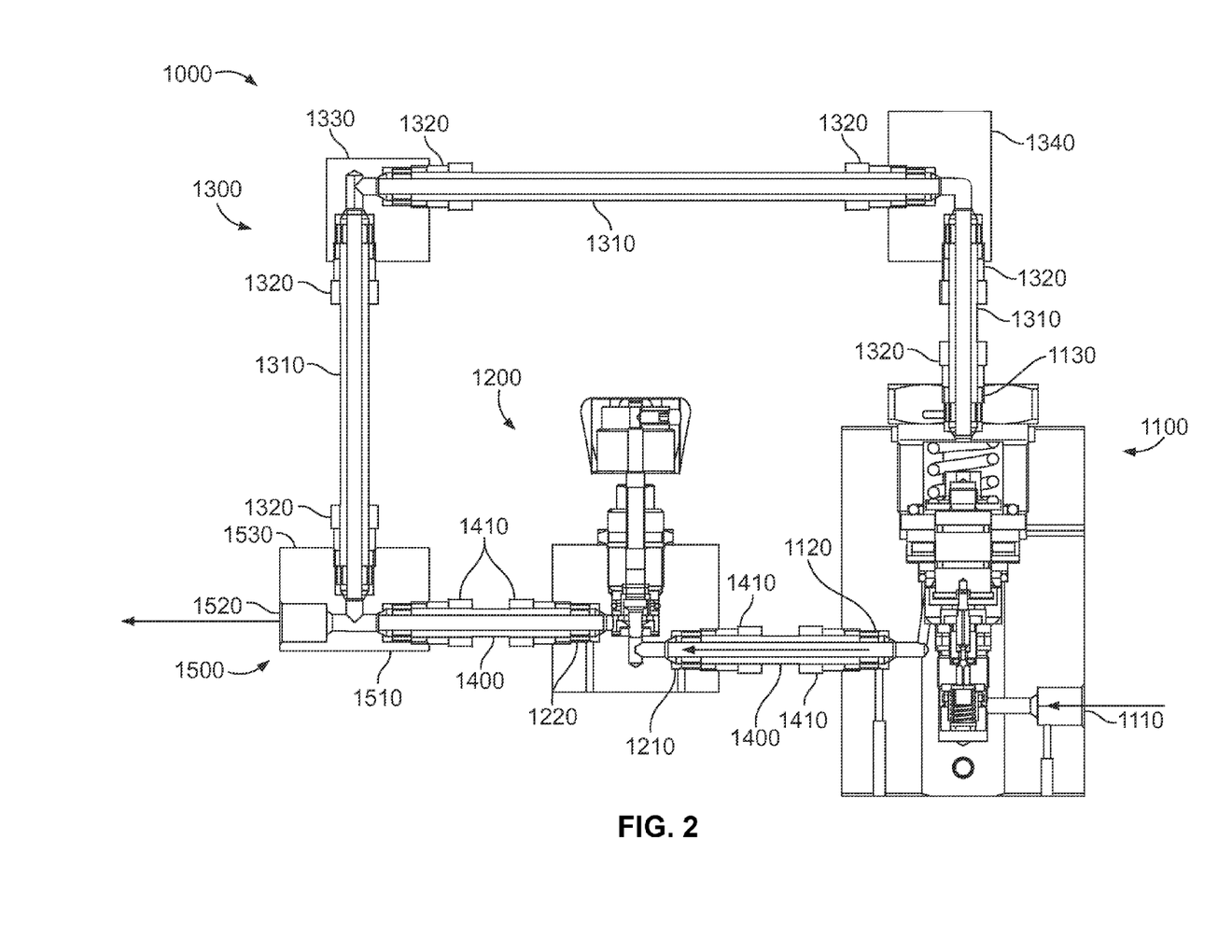
FIG. 2 is a side cross-sectional view of a known chemical injection assembly.

For example, as shown in FIG. 2, the field device 71 can be a typical chemical injection assembly 1000 that consists of a regulator 1100, a metering valve 1200, and an outlet pressure loop 1300. Regulator 1100 can be any fluid regulator that is acceptable for a given application, such as the TESCOM™ 56-2000 Series regulator, and has a fluid inlet 1110, a fluid outlet 1120, and an outlet pressure port 1130. Similarly, metering valve 1200 can be any metering valve that is acceptable for a given application, such as the TESCOM™ VJ Series valve, and has a valve inlet 1210 and a valve outlet 1220. Fluid inlet 1110 of regulator 1100 is in fluid communication with valve inlet 1210 through piping 1400 and connectors 1410. In addition, valve outlet 1220 is in fluid communication with an inlet 1510 of an outlet block 1500 through piping 1400 and connectors 1410, or other various well known methods. Outlet block 1500 also has a first outlet 1520, which can be connected to a downstream piping system (not shown) and a second outlet 1530 connected to and in fluid communication with outlet pressure loop 1300.

In the example shown, outlet pressure loop 1300 interconnects second outlet 1530 of outlet block 1500 and outlet pressure port 1130 of regulator 1100 through a series of pipes 1310, connectors 1320, and joint blocks 1330, 1340, such that the outlet pressure of the fluid at the outlet block 1500 is communicated to an actuator of regulator 1100 to control regulator 1100.

One drawback of known chemical injection assemblies, such as the chemical injection assembly 1000 illustrated in FIG. 2, is that during installation or maintenance chemical injection assembly 1000 is depressurized and air can build up in outlet pressure loop 1300. When chemical injection assembly 1000 is then re-pressurized at high injection pressures (e.g., 15,000 psi), the air in outlet pressure loop 1300 can damage chemical injection assembly 1000, such as regulator 1100.

In addition, known chemical injection assemblies consume considerable space and can be difficult and time-consuming to assemble. Moreover, known assemblies are prone to leakage stemming from, for example, the number of external flow paths that must be set-up between the various components and any variations in those flow paths (as a result of, for example, user assembly). Leakage can, in turn, lead to difficulties in maintaining set-point pressure, which can in turn create the need for significant and frequent maintenance and oversight.

Figure 3:
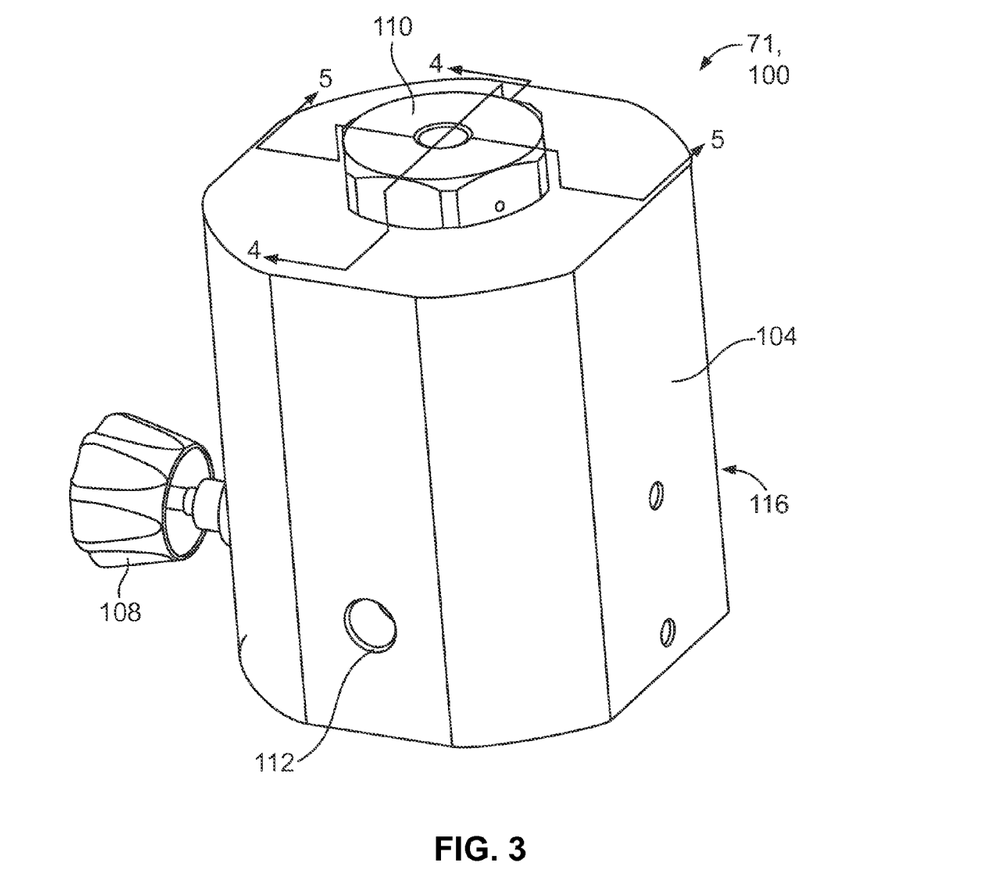
FIG. 3 is a perspective view of one example of a fluid regulating unit constructed in accordance with the principles of the present invention.

Referring now to FIG. 3, for the sake of description, field device 71 from FIG. 1 is shown as a fluid regulating unit 100 constructed in accordance with the principles of the present invention. The fluid regulating unit 100 is configured for use as an injection rate control device (e.g., a chemical injection rate control device) in oil and gas applications, though it will be appreciated that the fluid regulating unit 100 can be used with other process control applications as well. As shown in FIG. 3, the fluid regulating unit 100 has a single or unitary body 104, a control knob 108 coupled to and extending outwardly from the body 104, and a bonnet 110 movably coupled to a top of the body 104. Further details regarding the control knob 108 and the bonnet 110 will be described below.

The unit 100 also has an inlet 112 and an outlet 116 (not visible in FIG. 3, but visible in FIG. 4) defined or formed in opposite portions, respectively, of the body 104. The inlet 112 is configured to receive a flow of fluid from an upstream element (e.g., one of the field devices) of the process control system 10, while the outlet 116 is configured to provide a regulated flow of fluid to a downstream element of the process control system 10.

Figure 4:
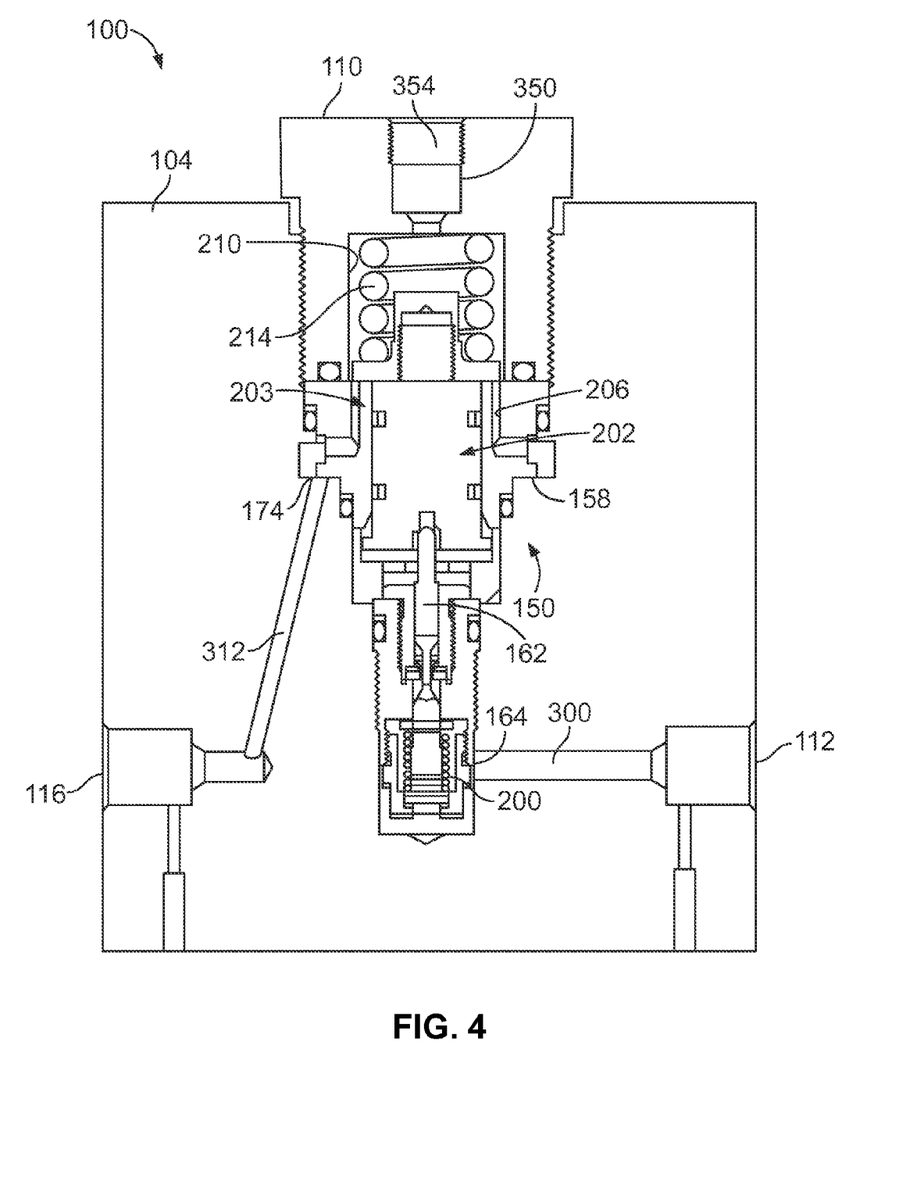
FIG. 4 is a cross-sectional view of the fluid regulating unit of FIG. 3 taken along line 4-4 in FIG. 3.
Figure 5:
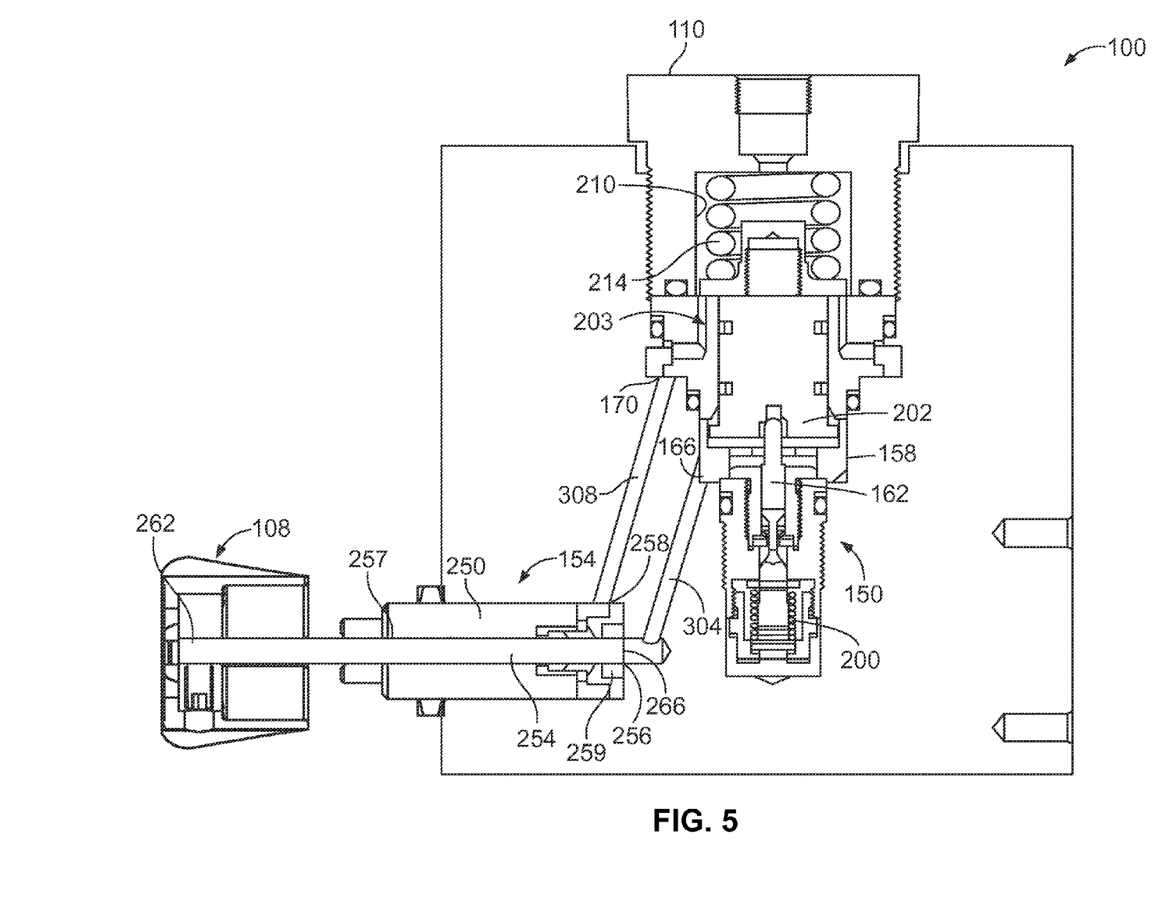
FIG. 5 is a cross-sectional view of the fluid regulating unit of FIG. 3 taken along line 5-5 in FIG. 3.

With reference now to FIGS. 4 and 5, the fluid regulating unit 100 generally includes a pressure regulator 150 (e.g., the TESCOM™ 56-2000 Series regulator) and a control valve 154 (e.g., the TESCOM™ VJ Series valve) arranged downstream of the pressure regulator 150. The pressure regulator 150 and the control valve 154 are both integrated into the body 104 of the unit 100. Beneficially, this allows the fluid flow passageways that fluidly connect the inlet 112, the outlet 116, the pressure regulator 150, and the control valve 154 to be arranged internally within the body 104, as will be described in greater detail below.

Figure 6:
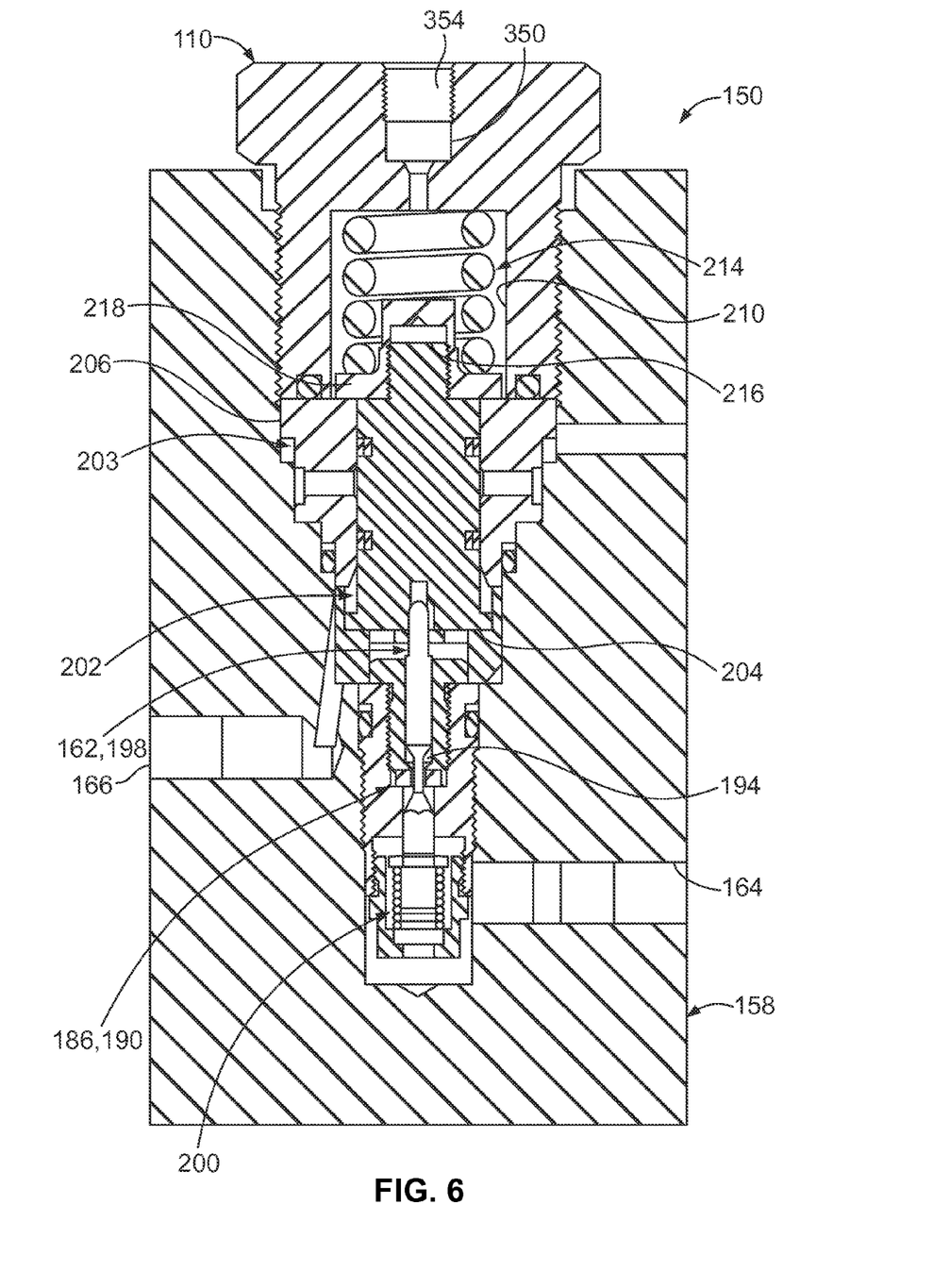
FIG. 6 is a partial cross-sectional view of the fluid regulating unit of FIG. 3.

As illustrated in FIGS. 4-6, the pressure regulator 150 in this example is a dome-loaded pressure regulator that includes a valve body 158 and a control assembly 162. The valve body 158 has a first inlet 164, a first outlet 166, a second inlet 170, and a second outlet 174. As illustrated in FIG. 4, the first inlet 164 is fluidly coupled to the inlet 112 of the body 104, and the second outlet 174 is fluidly coupled to the outlet 116 of the body 104. The first outlet 166 and the second inlet 170 are fluidly coupled to an inlet and an outlet, respectively, of the control valve 154, as will be described in greater detail below.

As best seen in FIG. 6, which illustrates the internal components of the pressure regulator 150, the valve body 158 defines a gallery 186 defining a seating surface 190. The control assembly 162 is carried within the valve body 158 and includes a valve connector 194 and a valve stem 198 operatively coupled to the valve connector 194. The valve connector 194 is urged or biased away the seating surface 190 via a spring 200. The valve connector 194 is movable between a closed position in sealing engagement with the seating surface 190 and an open position spaced away from the seating surface 190 in response to pressure changes in the pressure regulator 150, as will be described in greater detail below.

The pressure regulator 150 further includes a primary sensor 202, which in this example takes the form of a piston, slidably engaged within a secondary, or back-up, sensor 203. The secondary sensor 203 is itself slidably engaged within an inner cavity or chamber 206 defined in the valve body 158. A bottom surface 204 of the sensor 202 is in fluid communication with the first outlet 166 of the pressure regulator and receives a portion of the valve stem 198, such that the sensor 202 can move the valve stem 198, and, in turn, the control element 194 coupled thereto. The bonnet 110 is, in this example, threaded into the body 158; together, the bonnet 110 and the valve body 158 define a control or reference chamber 210. A spring 214 is disposed within the reference chamber 210. The reference chamber 210 is also configured to receive fluid after it has passed through the regulator 150 and the control valve 154, as will be described below. A top surface 216 of the sensor 202 is in fluid communication with the reference chamber 210 via a spring pad 218. The spring 214 and the fluid in the reference chamber 210 together apply a downward force on the spring pad 218, which in turn applies a downward force on the top surface 216 of the sensor 202, thereby biasing the valve connector 194 against the seating surface 190. The amount of force provided by the spring 214 is set based on a desired pre-set pressure of the fluid regulator 100. If desired, the amount of force applied by the spring 214 can be adjusted by moving (e.g., rotating) the bonnet 110 toward or away from the body 104.

While not explicitly described herein, it will be appreciated that the pressure regulator 150 includes a number of other components, such as, for example, seals (o-rings), back-up rings, and springs. It will also be appreciated that the pressure regulator 150 can have a different shape, size, and/or different components than those illustrated in FIG. 6. As an example, the valve connector 194 can instead take the form of a disc or any other type of control element. As another example, the sensor 202 can take the form of a diaphragm instead of the piston illustrated in FIGS. 4 and 5. In some cases, the regulator 150 need not include the back-up sensor 203.

With reference back to FIGS. 4 and 5, the control valve 154 in this example is a metering valve that includes a body 250 and a control element 254. The body 250 has an inlet 256 and an outlet 258. As illustrated in FIG. 5, the inlet 256 is fluidly coupled to the first outlet 166 of the regulator 150, and the outlet 258 is fluidly coupled to the second inlet 170 of the regulator 150. The control element 254, which in this example is a plug, is movably disposed within a bore 257 of the body 250. As best illustrated in FIG. 5, the control element 254 is movable relative to an orifice 259 formed within the body 250 to control the rate of fluid flow through the control valve 154. The control element 254 has a first end 262 that is threadingly engaged within the control knob 108. Thus, by actuating the control knob 108, the control valve 154 can be moved between an open position in which a second end 266 of the control element 254 is spaced from the orifice 259, thereby permitting full fluid flow through the valve 154, and a closed position in which the second end 266 of the control element 254 is seated in the orifice 259, thereby blocking fluid flow through the valve 154. Of course, the control valve 154 can be moved to any number of different positions between the open position and the closed position, whereby a limited fluid flow is permitted through the valve 154.

While the control valve 154 illustrated in FIGS. 4 and 5 is a metering valve, the control valve 154 can instead take the form of a shear valve or any other suitable valve. It will also be appreciated that the components of the control valve 154 illustrated in FIGS. 4 and 5 can vary. For example, the body 250 and/or the control element 254 can have a different shape and/or size. If desired, the control element 254 can be actuated differently, for example by coupling the control element 254 to the control knob 108 in a different manner or using a different type of actuator.

Because the pressure regulator 150 and the control valve 154 are integrated into the same body (the body 104 of the regulator 100), the various flow paths necessary for the operation of the regulator 100 can be arranged entirely within the body 104 of the regulator 100. The regulator 100 illustrated in FIGS. 4 and 5 includes four internally arranged or formed passageways—a first passageway 300, a second passageway 304, a third passageway 308, and a fourth passageway 312. The first passageway 300 is formed between and fluidly connects the first inlet 164 of the regulator 150 and the inlet 112 of the body 104. The second passageway 304 is formed between and fluidly connects the first outlet 166 of the regulator 150 and the inlet 256 of the control valve 250. The third passageway 308 is formed between and fluidly connects the outlet 258 of the control valve 250 and the second inlet 170 of the regulator 150. The fourth passageway 312 is formed between and fluidly connects the second outlet 174 of the regulator 150 and the outlet 116 of the body 104.

When the process control system 10 is in operation, fluid can be provided to the fluid regulator 100 from an upstream component of the system 10 via the inlet 112. The fluid is then transferred into the pressure regulator 150, particularly the first inlet 164 of the regulator 150, via the first passageway 300. The pressure regulator 150 regulates the pressure of the fluid based on a desired or set output pressure. Initially, the desired output pressure (i.e., the desired pressure at the first outlet 166) will correspond to the amount of force provided by the spring 214 (i.e., the degree to which the spring 214 biases the sensor 202). Over time, however, the output pressure will correspond to the amount of force provided by the spring 214 as well as the pressure of the fluid in the reference chamber 210 (i.e., the pressure of the fluid after it has passed through the control valve 154). When the pressure at the first inlet 164 is less than the desired output pressure, the sensor 202 is displaced toward the seating surface 190, which thereby moves the valve connector 194 toward the seating surface 190. This movement increases the pressure of the fluid at the first inlet 164. Conversely, when the pressure at the first inlet 164 is greater than the desired output pressure, the sensor 202 is displaced away from the seating surface 190, which thereby moves the valve connector 194 away from the seating surface 190. This movement decreases the pressure of the fluid at the first inlet 164.

The fluid output from the pressure regulator 150 is output at the outlet 166 and transferred from the outlet 166 to the control valve 154, particularly the inlet 258 of valve 154, via the second passageway 304. The control valve 154 subsequently processes the fluid and outputs the fluid at a controlled rate that is based on the position of the control element 254. The fluid output from the control valve 154 is then routed back to the pressure regulator 150 via the third passageway 308. Specifically, the fluid output from the control valve 150 is transferred from the outlet 258 to the second inlet 170 of the pressure regulator 150, which in this example is defined proximate to the reference chamber 210. The fluid is then transferred or routed to the reference chamber 210 via at least one opening (e.g., a series of openings) formed in the back-up sensor 203 of the regulator 150 (in other examples, the fluid can be transferred via at least one opening formed in the body 158 of the regulator or some other component of the regulator 150). In other words, the outlet pressure is referenced within the dome sensing portion of the pressure regulator 150. This helps to maintain a consistent flow rate at a set inlet pressure.

The fluid is transferred out of the reference chamber 210 via at least one opening (e.g., a series of openings) formed in the back-up sensor 203 at a position opposite the at least one opening via which the fluid flows into the reference chamber 210 (in other examples, the fluid can be transferred via at least one opening formed in the body 158 of the regulator or some other component of the regulator 150). The fluid then flows out of the pressure regulator 150 via the second outlet 174, which in this example is disposed proximate the reference chamber 210 and opposite the second inlet 170. The fluid is subsequently transferred from the second outlet 174 to the outlet 116 of the regulator 100 via the fourth passageway 312. At this time, the regulated fluid can be provided to a downstream component of the system 10 via the outlet 116.

As also illustrated in FIGS. 4-6, the regulator 100 can also include a bleed port 350 formed in the bonnet 110 and a bleed plug 354 removably disposed in the bleed port 350. The bleed port 350 and the bleed plug 354 facilitate the removal of air that gets trapped in the regulator 100 when the regulator 100 is initially assembled or when the associated line is depressurized and re-pressurized (e.g., for service reasons) at high injection pressures (e.g., 15,000 psi).

The bleed plug 354 can be any industry standard plug and, in the example shown, is generally cylindrical and has an outer surface that is threaded to engage the threaded inner surface of the bleed port 350. In the example shown, the bleed plug 354 is made of metal for use in high pressure applications and has a surface, a tapered surface in the example shown, that sealingly engages a surface of the bleed port 350 when the bleed plug 354 is in a closed position.

Based on the foregoing description, it should be appreciated that the present disclosure provides a fluid regulating unit in which all of the components and flow paths are integrated into a single body. The integrated unit takes up less space (than the components, on their own, would) and requires little to no assembly, and, as such, minimizes variation (which can be quite significant in known assemblies). Replacement parts are thus standardized, such that repair parts may be supplied to the customer without requiring full unit disassembly. Moreover, because the flow paths are integrated into the single body, no external piping needs to be utilized (e.g., assembled) to transfer fluid flow between the various components of the fluid regulating unit. This significantly reduces the potential for leakage. The integrated unit is also configured to reference the outlet pressure from the control valve within the sensing portion of the pressure regulator. This not only helps to maintain a consistent flow rate at a set inlet pressure, but because the flow path is internally located within the integrated unit, reduces the footprint of the unit.

The invention claimed is:

1. A fluid regulating unit, comprising:
  a body having an inlet and an outlet configured to output a regulated flow of fluid, the body further defining a flow path between the inlet and the outlet;
  the body integrating a pressure regulator and a control valve, the pressure regulator and the control valve each disposed in the flow path within the body, the pressure regulator having a first inlet port, a second inlet port, a first outlet port, and a second outlet port, and the control valve having an inlet port and an outlet port,
  wherein the first inlet port of the pressure regulator is fluidly coupled to the inlet of the body within the fluid regulating unit, the first outlet port of the pressure regulator is fluidly coupled to the inlet port of the control valve within the fluid regulating unit, the outlet port of the control valve is fluidly coupled to the second inlet port of the pressure regulator within the fluid regulating unit, and the second outlet port of the pressure regulator is fluidly coupled to the outlet of the body within the fluid regulating unit, such that the flow path facilitates fluid flow within the fluid regulating unit through the pressure regulator, through the control valve, and back through the pressure regulator.

2. The fluid regulating unit of claim 1, wherein the inlet and the outlet are formed in opposite portions of the body.

3. The fluid regulating unit of claim 1, further comprising a control knob coupled to and extending outwardly from the body, the control knob configured to control the control valve.

4. The fluid regulating unit of claim 1, wherein the control valve includes a body and a control element movably disposed within the body, the control element being movable relative to an orifice formed in the body of the control valve to control flow rate.

5. The fluid regulating unit of claim 1, wherein the control valve comprises a metering valve.

6. The fluid regulating unit of claim 1, further comprising a bonnet movably coupled to the body.

7. The fluid regulating unit of claim 6, wherein the bonnet and a body of the pressure regulator define the reference chamber.

8. The fluid regulating unit of claim 7, wherein the reference chamber is positioned between the second inlet port and the second outlet port of the pressure regulator.

9. The fluid regulating unit of claim 6, wherein the bonnet includes a bleed port and further comprising a bleed plug movably disposed in the bleed port, the bleed port in fluid communication with the outlet port of the control valve, the bleed plug movable between a closed position in which the bleed plug seals the bleed port and an open position in which the bleed port exhausts air from the control valve.

10. A fluid regulating unit, comprising:
  a body having an inlet, an outlet configured to output a regulated flow of fluid, and a flow path defined between the inlet and the outlet;
  the body integrating a pressure regulator and a control valve, the pressure regulator and the control valve each disposed in the flow path;
  a first flow passageway arranged in the body and configured to transfer a flow of fluid received via the inlet of the body to the pressure regulator, the pressure regulator configured to output the flow of fluid at a desired pressure;

a second flow passageway arranged in the body and configured to transfer the flow of the fluid output by the pressure regulator to the control valve, the control valve configured to output the flow of fluid at a desired flow rate;

a third flow passageway arranged in the body and configured to transfer the flow of the fluid output by the control valve to a reference chamber of the pressure regulator; and a fourth flow passageway arranged in the body and configured to transfer the flow of fluid from the reference chamber of the pressure regulator to the outlet of the body.

11. The fluid regulating unit of claim 10, further comprising a control knob coupled to and extending outwardly from the body, the control knob configured to control the control valve.

12. The fluid regulating unit of claim 10, wherein the control valve includes a body and a control element movably disposed within the body, the control element being movable relative to an orifice formed in the body of the control valve to control flow rate.

13. The fluid regulating unit of claim 10, further comprising a bonnet movably coupled to the body.

14. The fluid regulating unit of claim 13, wherein the bonnet and a body of the pressure regulator define the reference chamber.

15. The fluid regulating unit of claim 14, wherein the reference chamber is positioned between the second inlet port and the second outlet port of the pressure regulator.

16. The fluid regulating unit of claim 13, wherein the bonnet includes a bleed port and further comprising a bleed plug movably disposed in the bleed port, the bleed port in fluid communication with the outlet port of the control valve, the bleed plug movable between a closed position in which the bleed plug seals the bleed port and an open position in which the bleed port exhausts air from the control valve.

17. A fluid regulating unit, comprising:
a body having an inlet, an outlet configured to output a regulated flow of fluid, and a flow path defined between the inlet and the outlet;

the body integrating a pressure regulator and a control valve, the pressure regulator and the control valve each disposed in the flow path;

the pressure regulator having a regulator body, a control assembly configured to control a fluid flow through the regulator body, a sensor operatively coupled to the control assembly to control a position of the control assembly, and a bonnet movably coupled to the regulator body, the regulator body and the bonnet defining a reference chamber disposed in the flow path, the reference chamber configured to apply a reference force to the sensor to control the fluid flow through the regulator body, the fluid regulating unit further comprising a biasing spring disposed in the reference chamber, the reference force comprising a first force generated by the biasing spring and a second force generated by fluid flowing between the inlet and the outlet via the reference chamber.

18. The fluid regulating unit of claim 17, further comprising a control knob coupled to and extending outwardly from the body, the control knob configured to control the control valve.

19. The fluid regulating unit of claim 17, wherein the control valve includes a body and a control element movably disposed within the body, the control element being movable relative to an orifice formed in the body of the control valve to control flow rate.

20. The fluid regulating unit of claim 17, wherein the bonnet includes a bleed port and further comprising a bleed plug movably disposed in the bleed port, the bleed port in fluid communication with the reference chamber, the bleed plug movable between a closed position in which the bleed plug seals the bleed port and an open position in which the bleed port exhausts air from the fluid regulating unit.

21. The fluid regulating unit of claim 17, further comprising a flow passageway arranged in the body and configured to fluidly couple the control valve and the reference chamber.

* * * * *

UNITED STATES PATENT AND TRADEMARK OFFICE
CERTIFICATE OF CORRECTION

PATENT NO. : 9,678,513 B2  
APPLICATION NO. : 14/791860  
DATED : June 13, 2017  
INVENTOR(S) : Eric J. Burgett et al.

Page 1 of 1

It is certified that error appears in the above-identified patent and that said Letters Patent is hereby corrected as shown below:

In the Specification

At Column 3, Line 24, "FIG. 3; and" should be -- FIG. 3; --.

At Column 7, Line 26, "control element 194" should be -- valve connector 194 --.

At Column 8, Line 37, "control valve 250." should be -- control valve 154. --.

At Column 8, Lines 38-39, "control valve 250" should be -- control valve 154 --.

At Column 9, Line 3, "inlet 258" should be -- inlet 256 --.

At Column 9, Line 10, "control valve 150" should be -- control valve 154 --.

Signed and Sealed this  
Fifth Day of May, 2020

Andrei Iancu  
*Director of the United States Patent and Trademark Office*